United States Patent [19]

Hueller

[11] Patent Number: 4,813,228
[45] Date of Patent: Mar. 21, 1989

[54] GAS TURBINE

[75] Inventor: Joseph Hueller, Munich, Fed. Rep. of Germany

[73] Assignee: MTU Motoren-und Turbinen-Union Munchen GmbH, Munich, Fed. Rep. of Germany

[21] Appl. No.: 131,945

[22] Filed: Dec. 11, 1987

[30] Foreign Application Priority Data

Dec. 12, 1986 [DE] Fed. Rep. of Germany ....... 3642506

[51] Int. Cl.$^4$ ............................ F02C 3/10; F02C 7/10
[52] U.S. Cl. ............................... 60/39.161; 60/39.511
[58] Field of Search ....................... 60/39.511, 39.161; 165/145

[56] References Cited

U.S. PATENT DOCUMENTS

| 2,403,388 | 7/1946 | Morey et al. | 60/39.511 |
| 2,631,430 | 3/1953 | Staley et al. | 60/39.511 |
| 2,946,192 | 7/1960 | Hambling | 60/39.511 |
| 4,031,953 | 6/1977 | Kline | 60/39.511 |
| 4,382,359 | 5/1983 | Sampayo | 60/39.511 |
| 4,475,586 | 10/1984 | Grieb et al. | 165/134 R |

FOREIGN PATENT DOCUMENTS

| 2353956 | 4/1975 | Fed. Rep. of Germany ... | 60/39.511 |
| 053132130 | 3/1983 | Fed. Rep. of Germany . | |
| 3529457 | 2/1987 | Fed. Rep. of Germany ... | 60/39.511 |
| 541307 | 11/1941 | United Kingdom ............ | 60/39.161 |

OTHER PUBLICATIONS

Wehrtechnik—Gas Turbine by Heilmann pp. 60-62, 2/85.

Primary Examiner—Donald E. Stout
Attorney, Agent, or Firm—Roberts, Spiecens & Cohen

[57] ABSTRACT

A gas turbine plant in which the drive line of a power turbine extends substantially parallel to the longitudinal axis of the gas generator, the compressor drive turbine and power turbine being traversed in opposite directions by heated exhaust gases from a combustion chamber. A heat exchanger receives exhaust gases from the power turbine to heat compressed air to be delivered to the combustion chamber. The heat exchanger includes a matrix of U-shaped tubes connected to supply and discharge ducts of compressed air. The entire tube matrix is enclosed within an exhaust gas collector housing mounted downstream of the exhaust gas outlet of the power turbine and extending along the combustion chamber. The ducts are arranged in substantially parallel, adjacent relation and are each closed at one end. The open ends of the supply ducts respectively communicate with an outer channel of the plant which terminates at an end of the combustion chamber to receive compressed air to be heated. The open end of the discharge ducts connects directly into the combustion chamber.

21 Claims, 2 Drawing Sheets

GAS TURBINE

FIELD OF THE INVENTION

The present invention relates to a gas turbine plant having a gas generator consisting of a compressor, a combustion chamber and a compressor drive turbine, in which the compressor drive turbine receives hot combustion gases from the combustion chamber in a direction opposite the feed stream of the compressor, the combustion chamber being arranged at the rear of the gas generator, the compressor drive turbine supplying exhaust gases to an offset power turbine after reversal of direction of the exhaust gases, the exhaust gases from the power turbine flowing through a heat exchanger for preheating the compressed air to be fed to the combustion chamber.

DESCRIPTION OF PRIOR ART

A gas turbine plant is disclosed in DE-OS No. 3132 130. In this plant a regenerative heat exchanger is arranged rotatably around an extension of the axis of the gas generator or around the combustion chamber and is provided with a disk-shaped matrix which is traversed by exhaust gas and compressed air to be preheated separated from each other in a continuous alternation. In this manner, a comparatively compact gas turbine plant can be obtained; the hot-gas section of the matrix lies in each case directly within the stream of exhaust gas of the power turbine so that the stream of exhaust gas can be fed with initially relatively small aerodynamic losses in the direction towards the disk matrix. The small "hydraulic diameter" of the disk matrix which results from the extremely small flow channels, however, necessarily results in comparatively large aerodynamic losses, both for the exhaust gases and the compressed air. Furthermore, in the known plant, only a part of the disk matrix can be traversed, in each case, by the exhaust gas, so that the available surface acted on by the hot gas is always comparatively small. In addition, in the case of the disclosed regenerative heat exchanger, so-called "hot-gas entrainment losses" are produced as a consequence of the continuous movement of the matrix around the axis of rotation of the heat exchanger from the relatively hot part (exhaust gas) into the relatively cold part (compressed air) of the plant.

Other disadvantages of the known disk-like regenerative heat exchanger are in the expense for construction and sealing resulting from the rotating system and the susceptibility to breakdown inherent therein.

From the journal "Wehrtechnik," No. 2, 1985, pages 60 and 62, it and corresponding U.S. Pat. No. 4,475,586. is known to equip a gas turbine plant with a so-called "lancet heat exchanger". The heat exchanger consists of two central ducts arranged parallel to and one above the other, from which the tube matrix projects in U-shape into the stream of exhaust gas of the plant. Before its entrance into the combustion chamber, the compressed air is conducted into the upper central duct and then flows, on both sides thereof, into the upper part of each matrix and thereafter into curved flow reversal bend portions from which the air then flows into the lower part of the matrix tubes. From the lower matrix parts, the heated compressor air flows into the lower central duct and then into a conduit leading to a combustion chamber.

Such a heat-exchanger, which is also known in principle from DE-PS No. 2907 810 is characterized, inter alia, by the following features:

The arrangement and development of the tubes for flow of the compressed air with a lenticular or oval cross section makes possible an optimal aerodynamic effectiveness as regards heat exchange and friction with the surrounding gas flow. A large number of such aerodynamically optimized tubes can be combined into a comparatively compact matrix or bundle of large density due to internesting of the tubes in adjacent rows.

By providing an inner central transverse web in each tube, two inner passages of approximately triangular shape are formed and comparatively large and effective heat transfer surfaces are made available. Additionally, the profiles of the tubes of the matrix substantially eliminate any danger of burning of their front and rear edges by the hot gases. A tube matrix developed in this manner is relatively resistant to impact and vibration as well as to dynamic loads during frequent changes of load.

Basically, such a heat exchanger makes possible a high degree of heat exchange with comparatively small size of the heat exchanger.

The combination of a known heat exchanger with profiled tubes and the gas turbine plant described in "Wehrtechnik," No. 2, 1985, pages 60 to 62, would produce relatively long tubes with frequent flow refersal portions from the compressor outlet to the upper central duct and from the lower central duct to the combustion chamber. This produces substantial aerodynamic losses and temperature losses of the heated compressed air before the air flows into the combustion chamber.

Furthermore, in the gas turbine plant disclosed in "Wehrtechnik" the power turbine is arranged axially behind the gas-generator turbine whereby an upward deflected stream of exhaust gas cannot expand uniformly against the entire extent of the tube matrix of the heat exchanger. Thus, conventionally, there is obtained a locally non-uniform mass flow distribution of the hot gases at the matrix which has inherent aerodynamic losses.

SUMMARY OF THE INVENTION

An object of the invention is to provide a gas turbine plant with a heat exchanger which has comparatively small aerodynamic and thermodynamic losses while being very economical and compact.

This object is achieved in a gas turbine plant of the aforementioned type in which the heat exchanger comprises a matrix of tubes of U-shape through which the compressed air flows and around which the exhaust gases from the power turbine flow to effect heat exchange between the exhaust gases and the compressed air, said heat exchanger including first and second parallel ducts, the first duct receiving compressed air and supplying the same to the matrix of tubes, the second duct receiving the compressed air after the same has passed through the tubes and has been heated by the exhaust gases flowing around the tubes, said plant further comprising an exhaust gas collector housing adjacent to said power turbine for receiving exhaust gases therefrom, said exhaust gas collector housing extending along said combustion chamber, said ducts each having one closed end and one open end, said open end of the first duct being in communication with said compressor, said open end of the second duct being directly in communication with said combustion chamber.

In this way, a highly efficient arrangement of a profiled tube heat exchanger is obtained in a gas turbine plant in a comparatively compact, essentially block shape. The space between the combustion chamber and a diffuser outlet of the power turbine can be utilized for optimal effectiveness of the profiled tube heat exchanger.

With approximately the same matrix volume as known heat exchangers of profiled matrix tubes, extremely short connecting elements can be utilized to convey the compressed air which is to be preheated through a feed channel which is integral with the power plant, on both sides along the combustion chamber, into corresponding first and second central ducts. The guidance of the air can therefore be effected in aerodynamically favorable manner over an extremely short path. The third central duct which directly conducts the heated compressed air into the combustion chamber requires practically no additional connection to conduct the heated compressed air into the combustion chamber. In this way, extremely small temperature losses of the heated compressed air are obtained.

Another substantial advantage over the known art is that the entire tube matrix of the heat exchanger is uniformly traversed by the stream of exhaust gases. Therefore, a predominantly uniform mass flow and velocity distribution of the hot gases on the tube matrix is obtained.

BRIEF DESCRIPTION OF THE FIGURES OF THE DRAWING

The invention will be further described with reference to the attached drawing, in which.

DETAILED DESCRIPTION OF A PREFERRED EMBODIMENT

Figure 1:
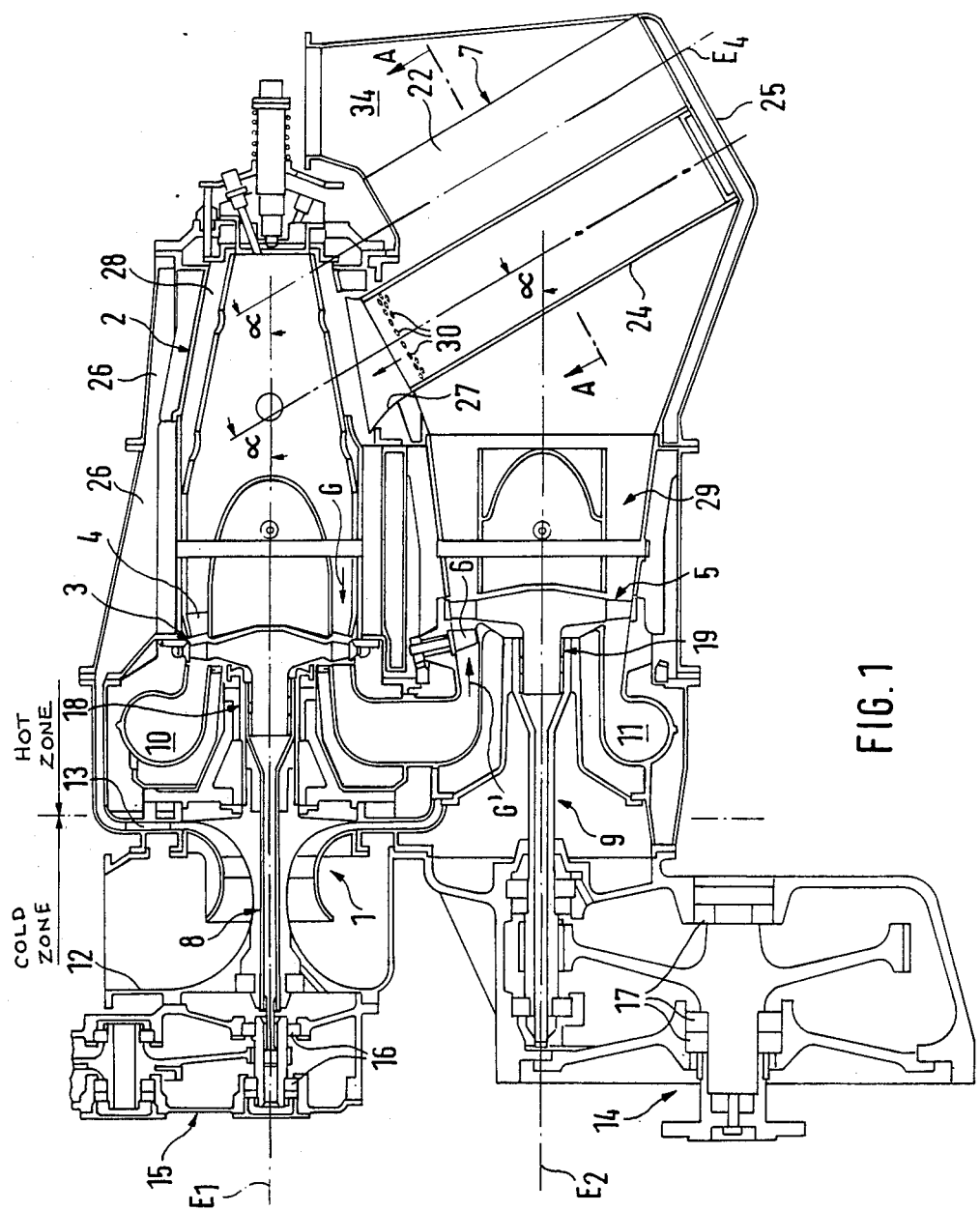
FIG. 1 is an axial longitudinal sectional view through the gas turbine plant of the invention.

FIG. 1 shows the gas generator of a gas turbine plant, the generator consisting of a compressor 1, a combustion chamber 2 and a compressor drive turbine 3 having guide blades or vanes 4.

A power turbine 5 is arranged downstream of the compressor drive turbine 3 for receiving exhaust gases therefrom. Displaceable guide vanes 6 are provided at the inlet of turbine 5.

The gas turbine plant of FIG. 1 additionally has a profiled tube heat exchanger 7, operating on the cross-flow/counter-flow principle, by which compressed air destined for the combustion chamber is pre-heated by the exhaust gas from the power turbine in a manner which will be explained in greater detail later.

As seen in FIG. 1 the drive line 8 of the gas generator (composed of the drive shaft of the compressor and the coaxial drive shaft of the turbine 3 for driving the compressor) and the drive line 9 of the power turbine 5 (composed of the drive shaft thereof) are arranged parallel to each other in two separate transverse center planes E1, E2.

As furthermore shown in FIG. 1, the compressor drive turbine 3 and the power turbine 5 are slightly axially offset from each other and acted on by gases flowing in opposite directions, as indicated by the arrows G and G'.

In accordance with FIG. 1, the compressor drive turbine 3 and the power turbine 5 communicate via two gas collection spiral chambers 10 and 11 disposed in a common transverse plane, spiral chamber 10 being arranged downstream of the compressor turbine 3 at the outlet of the gases therefrom while the spiral chamber 11 is arranged upstream of the power turbine 5 at the inlet for the gases.

As furthermore indicated in FIG. 1, the entire gas turbine plant is divided, on the one hand, into a relatively hot zone, and, on the other hand, into a relatively cold zone. In this regard, the relatively hot zone incorporates compressor turbine 3 as well as the power turbine 5, together with their corresponding conduits for hot gases, combustion chamber 2 and heat exchanger 7 while the relatively cold zone incorporates compressor 1, its air inlet housing 12 including a blade diffuser 13 as well as primary and secondary drive means 14 and 15 respectively.

Associated with the shaft 8 of the gas generator and the shaft 9 of the power turbine 5 are a main bearing 16 and a main bearing 17, constituting fixed bearings, which compensate for axial thrust. The main bearings can be oil-lubricated three-point ball bearings. The main bearings 16 and 17 are associated as integrated parts with the primary and secondary drive means 14, 15 in the cold zone. Further associated with the two shafts 8 and 9 are movable bearings 18 and 19, respectively, constituted as air bearings in the hot zone of the plant.

Preferably, the combustion chamber 2 is of pot shape and arranged upstream of the compressor drive turbine 3 and its inlet guide blades 4.

The heat exchanger 7 comprises bundles or matrixes of tubes 20, 21 (FIG. 2) intended to operate on the principle of cross-flow/counter-flow design as known in the art. Each matrix of tubes includes rectilinear branches and curved portions of U-shape joining the rectilinear branches for reversing the flow of compressed air conveyed through the tubes as will be explained in greater detail later. The heat exchanger further comprises central ducts 22, 23 and 24 connected to the rectilinear branches of the tube matrixes 20, 21. The entire arrangement of the matrixes 20, 21 and ducts 22, 23 and 24 is disposed within an exhaust gas collector housing 25 mounted at the outlet of the power turbine 5 and spatially widened behind the outlet of the power turbine 5 and extending along the combustion chamber 2. The central ducts 22, 23, 24 of the heat exchanger 7 extend substantially parallel to one another and each duct is closed at one end and open at the other end. The open ends of the first and second central ducts 22, 23 communicate with an outer channel 26 of the plant which terminates at an end of the combustion chamber and through which flows compressed air from the compressor 1. The open end of the central duct 24 is directly connected to the interior of the combustion chamber 2.

In a manner not shown in detail, the downstream end of the channel 26 connects to a short bifurcated pipe having laterally and downwardly projecting pipe ends each connected to an open end of a central duct 22 and 23 respectively.

In the embodiment of FIG. 1, the third central duct 24 includes an extension in the manner of a bushing 27 which widens in the direction of the air flow and extends into a secondary channel 28 of the combustion chamber 2, from which the preheated compressed air can be fed to the flame tube of the combustion chamber 2 as combustion air.

Figure 2:
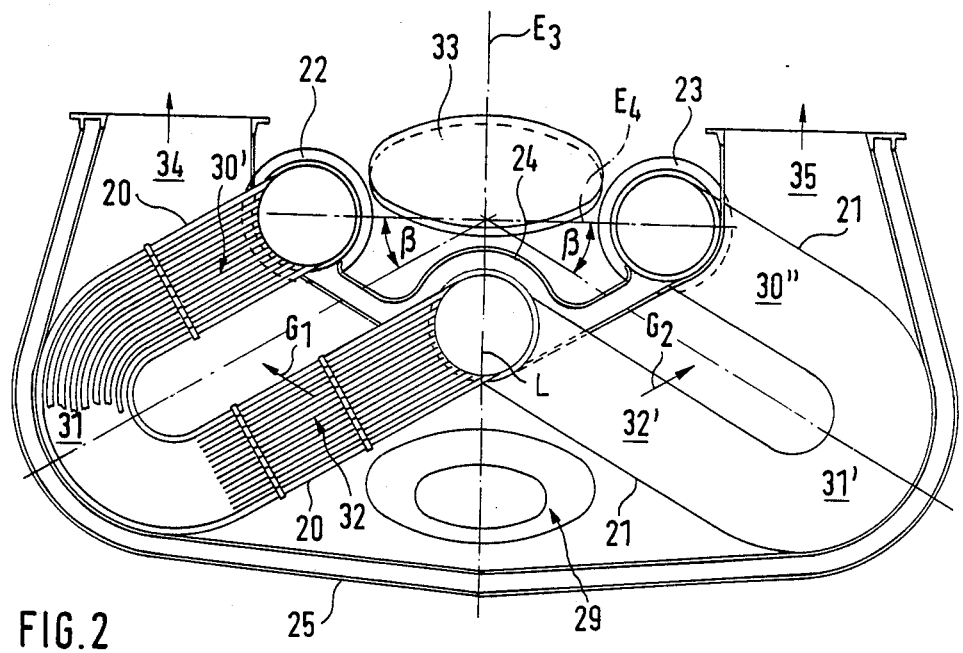
FIG. 2 is a sectional view taken along line A—A in FIG. 1.

As seen in FIG. 1, an axial diffuser 29 is advantageously arranged behind the exhaust gas outlet of the power turbine 5. The axial diffuser widens in the direction of gas flow and directly opens into an open end of the exhaust gas collector housing 25. The housing 25 widens spatially in the direction of gas flow and accomodates the tube matrixes 20, 21 and ducts 22, 23, 24. The housing 25 extends along the combustion chamber 2 and effectively incorporates the heat exchanger 7 into a confined space fitted approximately into the block outline of the gas turbine plant. Both tube matrixes 20, 21 are completely and uniformly traversed by the exhaust gas streams G1, G2 (FIG. 2).

Each tube matrix 20, 21 is comprised of the heat exchanger tubes 30 arranged in parallel rows extending along the entire length of the ducts 22, 23, 24, the first three of which rows are partially shown, in section, at the top of duct 24 in FIG. 1. The tubes 30 are elliptical or oval in cross-section and are offset in adjacent rows to form an internested arrangement in which the passages between the tubes are substantially uniform and streamlined. The exhaust gases from the power turbine 5 divide into streams $G_1$ and $G_2$ and are discharged respectively at outlets 34, 35 of the collector housing 25. The streams $G_1$ and $G_2$ flow around the tubes in the respective matrix in a direction generally longitudinally of the tubes in the sense that the major or longer axes of the oval tubes are arranged to extend in the direction of flow of the gas streams $G_1$, $G_2$.

In the operation of the gas turbine plant, the compressed air to be preheated passes from the downstream end of the channel 26 into the first and second central ducts 22, 23 wherefrom the compressed air flows into the corresponding upper rectilinear branches 30', 30'' of the tube matrixes, then into the arcuate reversal sections 31, 31' where the flow is reversed and then into the corresponding lower rectilinear branches 32, 32' from where the completely heated compressed air flows into the central third duct 24 and then into the combustion chamber 2 (FIG. 1). The rear cover of the combustion chamber is designated by numeral 33 in FIG. 2.

As illustrated in FIG. 1, it is extremely advantageous, in accordance with the invention, for all central ducts 22, 23, 24 to be inclined at the same angle $\alpha$ with respect to transverse central planes E1 and E2 of the gas generator and of the power turbine 5 respectively.

This described construction provides a relatively short path of travel for the compressed air into the first and second central ducts 22 and 23 with minimal aerodynamic losses. The inclination furthermore favors the direct conducting of the heated compressed air from the third central duct 24 into the combustion chamber 2. The inclination of the ducts permits the oval shaped tubes to extend with their longer axes substantially in the corresponding direction of flow of the exhaust gases $G_1$, $G_2$.

This result is assured, in accordance with the invention, when the central ducts 22, 23, 24 are inclined at an angle $\alpha$ of about 45° to 70° with respect to the transverse central planes E1 and E2 of the gas generator and the power turbine 5 respectively.

As particularly evident from FIG. 2, it is furthermore considered advantageous in accordance with the invention, if the distances between the third central duct 24 and the first and second central ducts 22, 23 are equal but less than the distance between the first and second central ducts 22, 23 and the third central duct 24 has its longitudinal axis L disposed in the longitudinal central plane E3 of the plant.

As further evident in FIG. 2, the U-shaped tube matrixes 20, 21 are arranged in opposed inclined fashion at equal angles $\beta$ tiled back towards the outlet of the power turbine 5. Stated more precisely, both tube matrixes 20, 21 can be inclined, in addition to the inclination established by the inclination of the central duct (angle $\alpha$—FIG. 1), by the angle $\beta$ from an oblique plane E4 which passes through the longitudinal axes of the first and second central ducts 22 and 23 respectively. The tube matrixes 20, 21 are inclined by angle $\beta$ about a common axis formed by the intersection of planes E3 and E4. In this way, a homogeneous gas flow can be obtained through the tube matrixes of the heat exchanger for a comparatively compactly constructed exhaust gas collector housing 25 which does not protrude too far laterally and thus further contributes to the overall compactness of the plant.

All advantageous structural and functional criteria of the gas turbine plant with the profiled tube heat exchanger according to FIGS. 1 and 2 which has been described above apply by analogy even if, in the case of the gas turbine plant, the axis of the shaft of the power turbine was arranged substantially adjacent and parallel to the axis of the shaft or the longitudinal central axis of the gas generator. In this case, the central ducts 22, 23, 24 which are arranged parallel to each other would be arranged obliquely at angle $\alpha$ with respect to the corresponding longitudinal central plane of the gas generator and/or the power turbine. The additional inclination (angle $\beta$) of the two matrixes 20, 21 would then produce, among others, a reduction in the structural height.

As can furthermore be seen from FIGS. 1 and 2, the exhaust gas collector housing extends downstream of the U-shaped matrixes 20, 21 into the two separate housing sections whose lateral outlets 34, 35 face upwardly.

The housing sections for a divided discharge of the exhaust gases in an exhaust system could, however, also be so developed, for instance, that the individual streams of exhaust gas are directed horizontally rearward, downstream of the two matrixes 20, 21.

While the invention has been described in relation to a specific embodiment thereof, it will become apparent to those skilled in the art that numerous modifications and variations thereof can be made within the scope and spirit of the invention as defined in the attached claims.

What is claimed is:

1. A gas turbine plant comprising a power turbine and a gas generator for supplying hot gases to the power turbine, said gas generator including a compressor for producing a flow of compressed air, a combustion chamber in which hot gases are produced by combustion of fuel mixed with the compressed air, and a compressor drive turbine receiving said hot gases from the combustion chamber for drive of the compressor drive turbine, said power turbine being arranged parallel to said gas generator and being driven by the exhaust gas flow from said compressor drive turbine, means defining a flow path for gases from the compressor drive turbine to the power turbine such that the exhaust gas flow driving the power turbine is in reverse counter current flow direction relative to the direction of hot gas flow driving the compressor drive turbine, and a cross-counter-flow heat exchanger connected to said compressor and to said power turbine for heat exchange between the compressed air and the exhaust gases from the power turbine, said heat exchanger comprising first and second matrixes of U-shaped tubes through which the compressed air flows and around which the exhaust gases from the power turbine flow to preheat the compressed air before it flows into the combustion chamber, said heat exchanger including first, second and third parallel ducts, the first and the second ducts receiving compressed air from said compressor, the first duct supplying the compressed air into the first matrix of tubes, the second duct supplying the compressed air into the second matrix of tubes, the third duct being connected to said first and second matrixes for receiving the compressed air after it has passed through said first and second matrixes of tubes and has been heated, said plant further comprising an exhaust gas collector housing adjacent to said power turbine for receiving exhaust gases therefrom, said exhaust gas collector housing extending along said combustion chamber and including said cross-counter-flow heat exchanger therein, said ducts each having one closed end and one open end, said open ends of said first and said second ducts being in communication with a channel surrounding said combustion chamber and receiving compressed air from said compressor, said open end of said third duct being directly in communication with said combustion chamber.

2. A plant as claimed in claim 1 comprising a diffuser connected to said power turbine to receive the exhaust gases therefrom, said diffuser being connected to said exhaust gas collector housing.

3. A plant as claimed in claim 2 wherein said exhaust gas collector housing widens spatially in a direction away from the diffuser.

4. A plant as claimed in claim 4 wherein the compressor drive turbine and said power turbine include respective parallel drive shafts.

5. A plant as claimed in claim 1 wherein the drive shaft of the power turbine is axially offset from the gas generator.

6. A plant as claimed in claim 5 wherein the drive shaft of the power turbine is below the gas generator.

7. A plant as claimed in claim 4 wherein said ducts are inclined at a common angle with respect to said parallel drive shafts.

8. A plant as claimed in claim 7 wherein said tubes of each said matrix are each of oval cross-section and have their longer axes positioned substantially in the direction of exhaust gas flow through the exhaust gas collector housing., 9. A plant as claimed in claim 1 wherein said three ducts and said two matrixes of tubes are substantially symmetrically arranged in said exhaust gas collector housing.

10. A plant as claimed in claim 1 wherein the tubes in each matrix are arranged in parallel rows in which the tubes in one row are offset from the tubes in the adjacent row such that the tubes form an internested arrangement.

11. A plant as claimed in claim 10 wherein said tubes include rectilinear branches connected to said ducts and U-shaped portions joining the rectilinear branches to reverse the direction of flow of compressed air in said tubes from one of the branches to the other.

12. A plant as claimed in claim 1 wherein said gas generator and said power turbine have respective transverse central planes which are substantially parallel to one another, said ducts being inclined with respect to said central planes at an angle of 45° to 70°.

13. A plant as claimed in claim 12 wherein each said matrix of tubes projects laterally from said ducts and said tubes are arranged in rows disposed in planes extending at an angle to said transverse central planes of the gas generator and power turbine.

14. A plant as claimed in claim 13 wherein said tubes include rectilinear rectiliner branches connected to respective ducts and U-shaped portions joining the rectilinear branches for reversing the flow of compressed air in said tubes from one of the branches to the other.

15. A plant as claimed in claim 16 wherein said exhaust gas collector housing has a central plane of symmetry passing through said second duct, said first and second ducts being symmetrically disposed on opposite sides of said central plane of symmetry.

16. A plant as claimed in claim 15 wherein said rectilinear branches of said tubes are acutely inclined with respect to said central plane of symmetry.

17. A plant as claimed in claim 16 wherein said first and second matrixes of tubes project laterally on opposite sides of said central plane of symmetry at opposite, equal angles of inclination.

18. A plant as claimed in claim 17 wherein said third duct has equal spacing with said first and second ducts which is less than the spacing between said first and third ducts.

19. A plant as claimed in claim 17 wherein said gas generator and said power turbine have a common longitudinal central plane which is coincident with the central plane of symmetry of the exhaust gas collector, said third duct having a longitudinal axis disposed in said coincident planes.

20. A plant as claimed in claim 19 wherein said exhaust gas collector housing includes two housing sections downstream of said tube matrixes having respective discharge outlets.

21. A plant as claimed in claim 20 wherein said discharge outlets face upwardly.

* * * * *